(12) United States Patent
Heimerdinger (10) Patent No.: US 12,550,234 B2
(45) Date of Patent: Feb. 10, 2026

(54) CALIBRATION METHOD FOR INFRARED SENSOR ON MICROWAVE APPLIANCE SOUS VIDE SYSTEM

(71) Applicant: Haier US Appliance Solutions, Inc., Wilmington, DE (US)

(72) Inventor: Mark Heimerdinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 820 days.

(21) Appl. No.: 17/944,508

(22) Filed: Sep. 14, 2022

(65) Prior Publication Data

US 2024/0090094 A1    Mar. 14, 2024

(51) Int. Cl.
| | |
|---|---|
| *H05B 6/68* | (2006.01) |
| *G01J 5/08* | (2022.01) |
| *G01J 5/80* | (2022.01) |
| *H05B 6/64* | (2006.01) |
| *G01J 5/00* | (2022.01) |

(52) U.S. Cl.
CPC ............ *H05B 6/687* (2013.01); *G01J 5/0859* (2013.01); *G01J 5/80* (2022.01); *H05B 6/6455* (2013.01); *H05B 6/681* (2013.01); *G01J 2005/0077* (2013.01)

(58) Field of Classification Search
CPC ............ G01J 2005/0077; G01J 5/0044; G01J 5/0859; G01J 5/80; H05B 6/6455; H05B 6/681; H05B 6/687
USPC ....... 219/711, 702, 704, 705, 518, 718, 719, 219/720, 752, 753, 754, 755, 762; 99/325, 451, DIG. 14
See application file for complete search history.

(56) References Cited

U.S. PATENT DOCUMENTS

| | | | |
|---|---|---|---|
| 4,751,356 A | 6/1988 | Fukuda et al. | |
| 9,414,442 B2 * | 8/2016 | Torres ..................... | H05B 6/02 |
| 10,721,948 B1 | 7/2020 | Swayne et al. | |
| 10,827,872 B2 | 11/2020 | Trice et al. | |

(Continued)

FOREIGN PATENT DOCUMENTS

| | | |
|---|---|---|
| CN | 105823098 B | 2/2018 |
| JP | 2005077021 A | 3/2005 |
| KR | 101728660 B1 | 4/2017 |

*Primary Examiner* — Quang T Van
(74) *Attorney, Agent, or Firm* — Dority & Manning, P.A.

(57) ABSTRACT

A microwave appliance includes a cabinet defining a cooking chamber, a magnetron, a temperature sensor directed toward the cooking chamber, and a controller. The controller is configured to measure a raw temperature of the cooking chamber, determine a calibrated temperature from the raw temperature and a conversion model, determine a preheat power level for the magnetron, and operate the magnetron at the preheat power level. The controller is further configured to determine a calibrated chamber temperature using a chamber temperature and a preheat conversion model and determine the calibrated chamber temperature has reached a target temperature. The controller is further configured to monitor a calibrated cooking temperature, based on a cooking temperature and a cooking conversion model, and operate the magnetron to a cooking power level to maintain the calibrated cooking temperature at the target temperature. A method of operating a microwave appliance with a temperature sensor is also disclosed.

20 Claims, 6 Drawing Sheets

(56) References Cited

U.S. PATENT DOCUMENTS

| | | |
|---|---|---|
| 10,863,589 B2 | 12/2020 | Lee et al. |
| 2007/0215608 A1* | 9/2007 | Yoshino ................ H05B 6/704 |
| | | 219/681 |
| 2019/0110630 A1 | 4/2019 | Kitabayashi |
| 2020/0281049 A1 | 9/2020 | Staun |
| 2020/0367692 A1 | 11/2020 | Stipe |
| 2020/0397177 A1 | 12/2020 | Walsh |

* cited by examiner

CALIBRATION METHOD FOR INFRARED SENSOR ON MICROWAVE APPLIANCE SOUS VIDE SYSTEM

FIELD OF THE INVENTION

The present subject matter relates generally to microwave appliances, and more particularly to infrared sensors in microwave appliances.

BACKGROUND OF THE INVENTION

Microwave appliances generally include a cabinet and a magnetron to heat food inside the cabinet. Generally, microwaves cook items inside the cabinet by bouncing microwave radiation around a cooking chamber inside the cabinet. Some embodiments further have a fan to evaporate moisture as the microwave heats inside the cooking chamber. Microwaves may be prone to "hot spots" or areas where articles placed inside are heated unevenly. A rotating tray may aid in reducing these hot spots, as the tray rotates the items inside the cooking chamber during activation of the magnetron to heat the cooking chamber.

Challenges exist in that detecting an accurate temperature within a microwave is difficult. The microwave radiation generating heat during cooking in the cooking chamber may distort temperature readings from sensors directed at the cooking chamber. While a rotating tray may reduce hot spots by moving articles around within the cooking chamber, such areas may still be prevalent in a microwave and may generate uneven cooking within the microwave. Further, a cooking chamber of the microwave may be reflective and may reflect infrared radiation within the cooking chamber in addition to infrared radiation being emitted into the cooking chamber by the magnetron, thus the amount of heat present in the microwave may increase and/or vary during the duration of cooking within the microwave.

These uneven and inaccurate temperatures may be seen as undesirable for more delicate cooking operations, such as sous vide cooking.

Accordingly, a method of operating a microwave using improved temperature reading techniques would be useful. Further, a microwave with more accurate temperature readings throughout the cooking chamber would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a microwave appliance is provided. The microwave appliance may include a cabinet defining a cooking chamber, a door, a magnetron, a temperature sensor, and a controller. The door may be configured to allow selective entry to the cooking chamber. The magnetron may be operable to generate microwave radiation to provide heat to the cooking chamber. The temperature sensor may be directed toward the cooking chamber. The controller may be in operative communication with the magnetron and the temperature sensor. The controller may be configured to measure a raw initial temperature of a heating zone within the cooking chamber using the temperature sensor, determine a preheat power level based at least in part on the raw initial temperature of the heating zone, operate the magnetron at the preheat power level, and monitor a calibrated chamber temperature using the chamber temperature and a preheat conversion model. The controller may further be configured to determine a calibrated chamber temperature using the chamber temperature and a preheat conversion model, determine that the calibrated chamber temperature has reached a target temperature, monitor a cooking temperature using the temperature sensor following determining the chamber temperature has reached the target temperature, determine a calibrated cooking temperature, based at least in part on the cooking temperature and a cooking conversion model, and operate the magnetron at a cooking power level selected to maintain the calibrated cooking temperature at the target temperature.

A method of operating a microwave appliance may also be provided. The method may be for a microwave appliance having a cooking chamber, a magnetron, and a temperature sensor. The method may include the steps of measuring a raw initial temperature of a heating zone within the cooking chamber using the temperature sensor, determining a preheat power level based at least in part on the raw initial temperature of the heating zone, operating the magnetron at the preheat power level, and monitoring a chamber temperature using the temperature sensor. The method may further include the steps of determining a calibrated chamber temperature based at least in part on the chamber temperature, determining that the calibrated chamber temperature has reached a target temperature, monitoring a cooking temperature using the temperature sensor in response to determining the chamber temperature has reached the target temperature, determining a calibrated cooking temperature, based at least in part on the cooking temperature and a cooking conversion model, and operating the magnetron at a cooking power level based selected to maintain the calibrated cooking temperature at the target temperature.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides an example temperature map produced by the temperature sensor of FIG. 3 according to exemplary embodiments of the present disclosure.

Use of the same or similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention advantageously provides a microwave appliance that may provide a method of determining temperatures within the microwave during the operation of the microwave with accuracy. Systems and methods described herein may also be employed to perform sous vide bath cooking in a microwave sous vide system. Calibration methods described herein may be employed to perform sous vide bath cooking in a microwave sous vide system, to provide accurate temperature readings during a preheat period, and to provide accurate temperature readings during a cooking period. Different calibrations, including different calibration methods for different periods, may be used to obtain more accurate temperatures of the inside of the microwave or items inside the microwave, during operation. Advantageously, more accurate temperature readings inside a microwave may allow for more accurate cooking applications, including sous vide bath cooking in a microwave.

Figure 1:
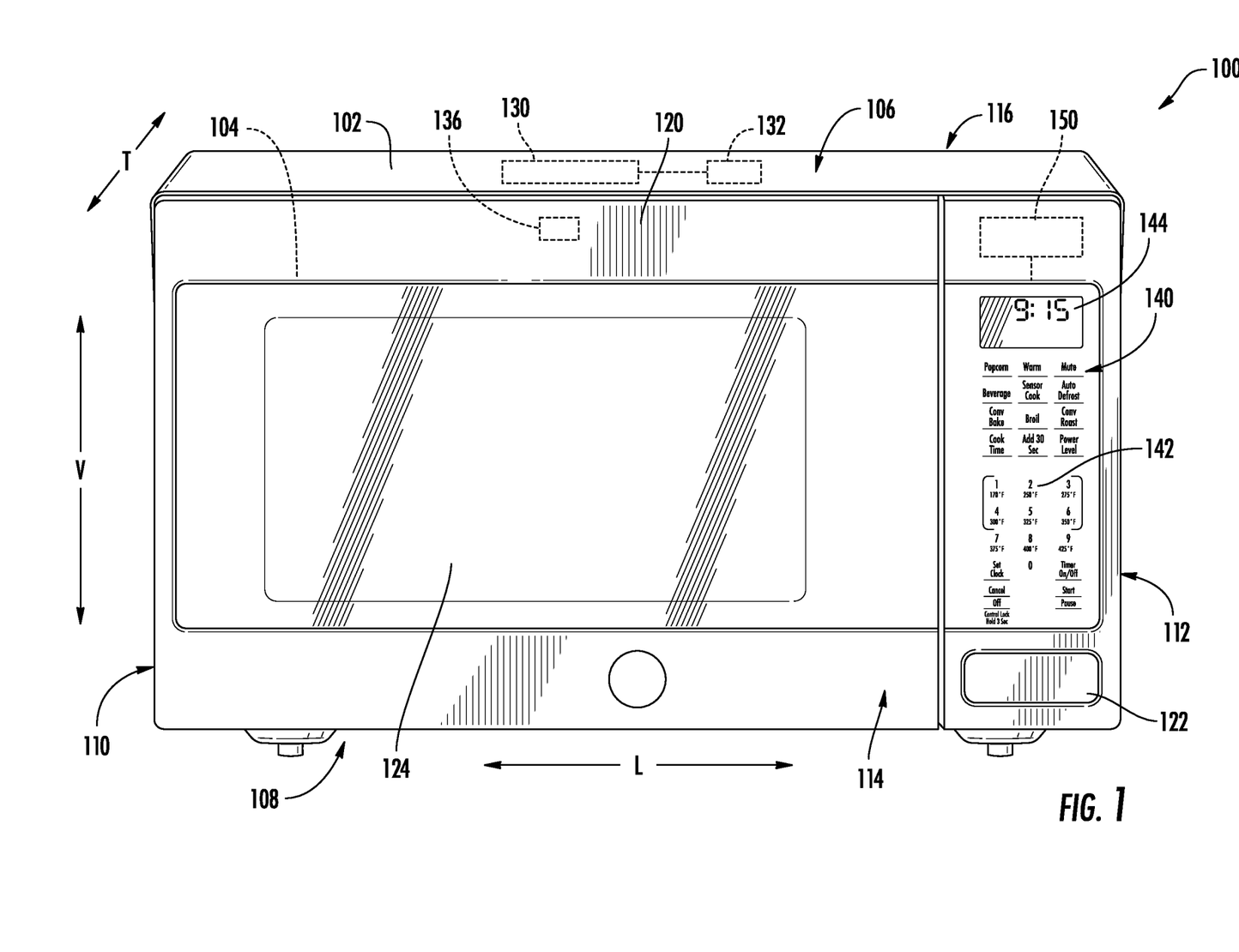
FIG. 1 provides a perspective front view of a microwave appliance in accordance with an example embodiment of the present disclosure.
Figure 2:
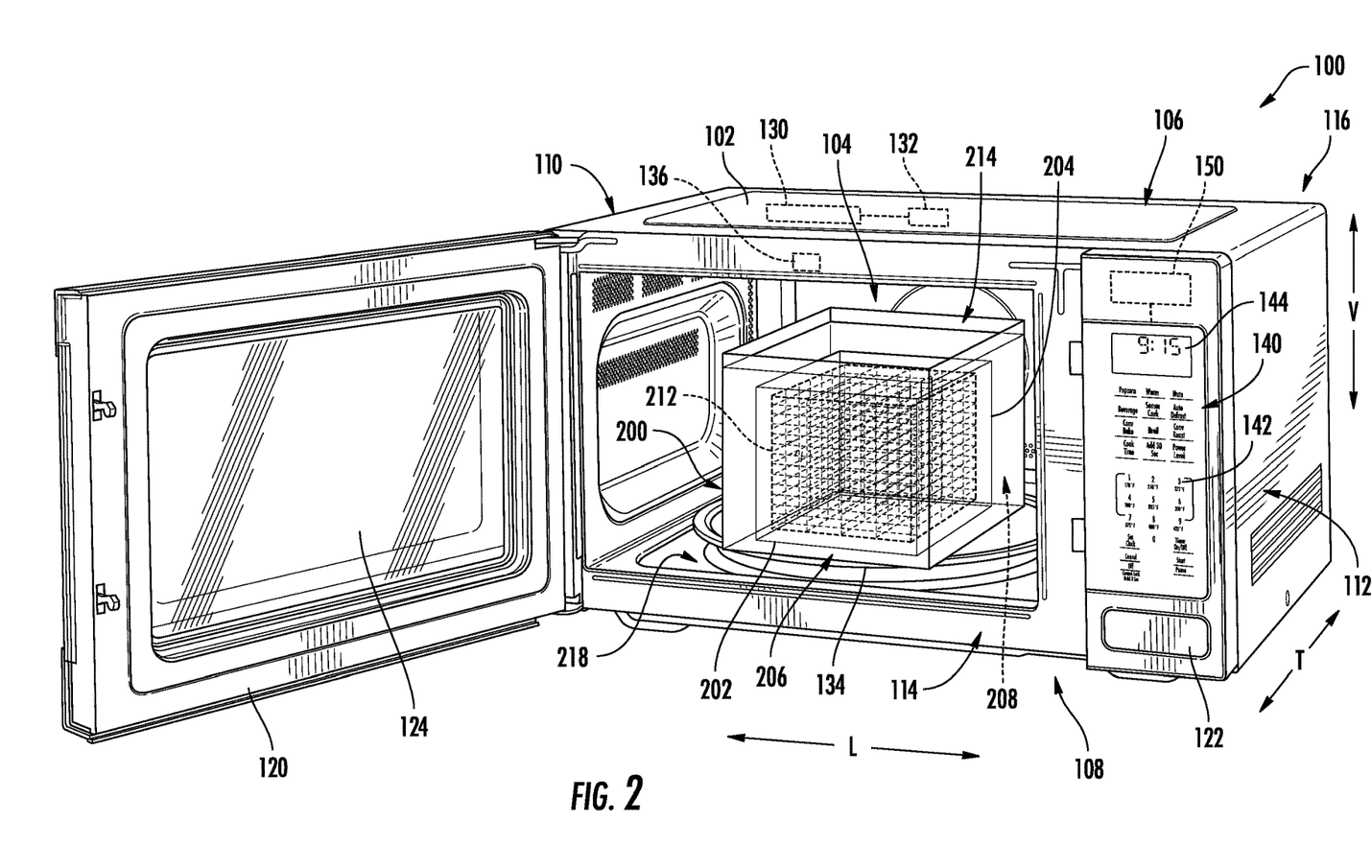
FIG. 2 provides a perspective view of the exemplary microwave appliance of FIG. 1 with the door in an open position according to exemplary embodiments of the present disclosure.

Referring now to the figures, FIG. 1 provides a front view of a microwave appliance 100 as may be employed with the present subject matter and FIG. 2 provides a perspective view of microwave appliance 100 with the door in the open position. Microwave oven 100 includes an insulated cabinet 102 that defines a cooking chamber 104 for receipt of food items for cooking. As will be understood by those skilled in the art, microwave appliance 100 is provided by way of example only, and the present subject matter may be used in any suitable microwave appliance, such as a countertop microwave appliance, an over-the-range microwave appliance, etc. Thus, the example embodiment shown in the figures is not intended to limit the present subject matter to any particular cooking chamber configuration or arrangement.

As illustrated, microwave appliance 100 generally defines a vertical direction V, a lateral direction L, and a transverse direction T, each of which is mutually perpendicular, such that an orthogonal coordinate system is generally defined. Cabinet 102 of microwave appliance 100 extends between a top 106 and a bottom 108 along the vertical direction V, between a first side 110 (left side when viewed from front) and a second side 112 (right side when viewed from front) along the lateral direction L, and between a front 114 and a rear 116 along the transverse direction T.

Microwave oven 100 includes a door 120 that is rotatably attached to cabinet 102 in order to allow selective entry to cooking chamber 104. A handle may be mounted to door 120 to assist a user with opening and closing door 120 in order to access cooking chamber 104. As an example, a user can pull on the handle mounted to door 120 to open or close door 120 and access cooking chamber 104. Alternatively, microwave appliance 100 may include a door release button 122 that disengages or otherwise pushes open door 120 when depressed. Glass windowpanes 124 provide for viewing the contents of cooking chamber 104 when door 120 is closed and also assist with insulating cooking chamber 104.

Microwave oven 100 is generally configured to heat articles, e.g., food or beverages, within cooking chamber 104 using electromagnetic radiation. Microwave appliance 100 may include various components which operate to produce electromagnetic radiation, as is generally understood. For example, microwave appliance 100 may include a microwave heating assembly 130 which may include a magnetron (such as, for example, a cavity magnetron), a high voltage transformer, a high voltage capacitor, and a high voltage diode.

According to exemplary embodiments, microwave appliance 100 may further include an inverter assembly 132 that is operably coupled to microwave heating assembly 130 to provide energy from a suitable energy source (such as an electrical outlet) to microwave heating assembly 130, e.g., the magnetron. The magnetron may convert the energy to electromagnetic radiation, specifically microwave radiation. Microwave heating assembly 130 and/or inverter assembly 132 may include other suitable components, such as a capacitor that generally connects the magnetron and power supply, such as via high voltage diode, to a chassis. Microwave radiation produced by the magnetron may also be transmitted through a waveguide to cooking chamber 104. Microwave radiation generated from the magnetron may provide heat to cooking chamber 104.

As would be appreciated by one having ordinary skill in the art, inverter assembly 132 allows the magnetron's analog electric field intensity to be adjusted between various power levels, such as between 10% and 100% of the total power capacity. In some examples, a power level may have a value between 1 and 10, with level 10 equating to 100% of the total power and level 1 equating to 10% of the total power capacity, with other levels equally spaced between the level 1 and level 10.

By contrast, with conventional non-inverter power supplies, the electric field intensity is either 100% or 0%, and power levels are made using a timed duty cycle. For example, a non-inverter assembly set for a 50% power level would turn the magnetron ON at 100% output power for 15 seconds, and then OFF for 15 seconds. At power levels less than 100%, inverter assembly 132 has much better heating uniformity and less penetration depth—ideal heating for sous vide as the inverter assembly heats the water while avoiding direct heating of the food with microwave energy.

The structure and intended function of microwave appliances are generally understood by those of ordinary skill in the art and are not described in further detail herein. According to alternative embodiments, microwave appliance 100 may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

Microwave oven 100 may include additional features to improve heating uniformity and precision. For example, according to an exemplary embodiment, microwave appliance 100 includes a turntable 134 rotatably mounted within cooking chamber 104. Turntable 134 may be selectively rotated during a cooking process to ensure improved temperature uniformity for the object being heated. In addition, microwave appliance 100 may include a temperature sensor 136 that can measure temperatures across the entire bottom of the cooking chamber 104. Temperature sensor 136 may detect temperatures at various distinct temperature locations, may associate certain locations with the food items being cooked, and may use a subset of the temperature data as feedback for regulating inverter assembly 132 and microwave heating assembly 130 for improved precision.

Referring again to FIG. 1, a user interface panel 140 and a user input device 142 may be positioned on an exterior of cabinet 102. The user interface panel 140 may represent a general purpose Input/Output ("GPIO") device or functional block. In some embodiments, the user interface panel 140 may include or be in operative communication with user input device 142, such as one or more of a variety of digital, analog, electrical, mechanical, or electro-mechanical input devices including rotary dials, control knobs, push buttons, and touch pads. The user input device 142 is generally positioned proximate to the user interface panel 140, and in some embodiments, the user input device 142 may be positioned on the user interface panel 140. The user interface panel 140 may include a display component 144, such as a digital or analog display device designed to provide operational feedback to a user.

Generally, microwave appliance 100 may include a controller 150 in operative communication with the user input device 142. The user interface panel 140 of the microwave appliance 100 may be in communication with the controller 150 via, for example, one or more signal lines or shared communication busses, and signals generated in controller 150 operate microwave appliance 100 in response to user input via the user input devices 142. Input/Output ("I/O") signals may be routed between controller 150 and various operational components of microwave appliance 100. Operation of microwave appliance 100 can be regulated by the controller 150 that is operatively coupled to the user interface panel 140.

Controller 150 is a "processing device" or "controller" and may be embodied as described herein. Controller 150 may include a memory and one or more microprocessors, microcontrollers, application-specific integrated circuits (ASICS), CPUs, or the like, such as general or special purpose microprocessors operable to execute programming instructions or micro-control code associated with operation of microwave appliance 100, and controller 150 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Aspects of the present subject matter are generally directed to systems and methods for implementing a sous vide cooking process in a microwave appliance, such as microwave appliance 100. More particularly, according to exemplary embodiments of the present subject matter, cooking chamber 104 is configured for receipt of a sous vide assembly 200 (e.g., on turntable 134) for facilitating a sous vide cooking process within microwave appliance 100. According to exemplary embodiments, turntable 134 is rotated during the sous vide process for improved thermal uniformity. As would be appreciated by one having ordinary skill in the art, a sous vide cooking process is a type of cooking where a food item (such as meat) is vacuum sealed in a bag and submerged in a bath of water maintained at a desired or target temperature until the meat reaches the desired internal temperature. Notably, precise temperature control is very desirable for sous vide cooking processes.

Figure 3:
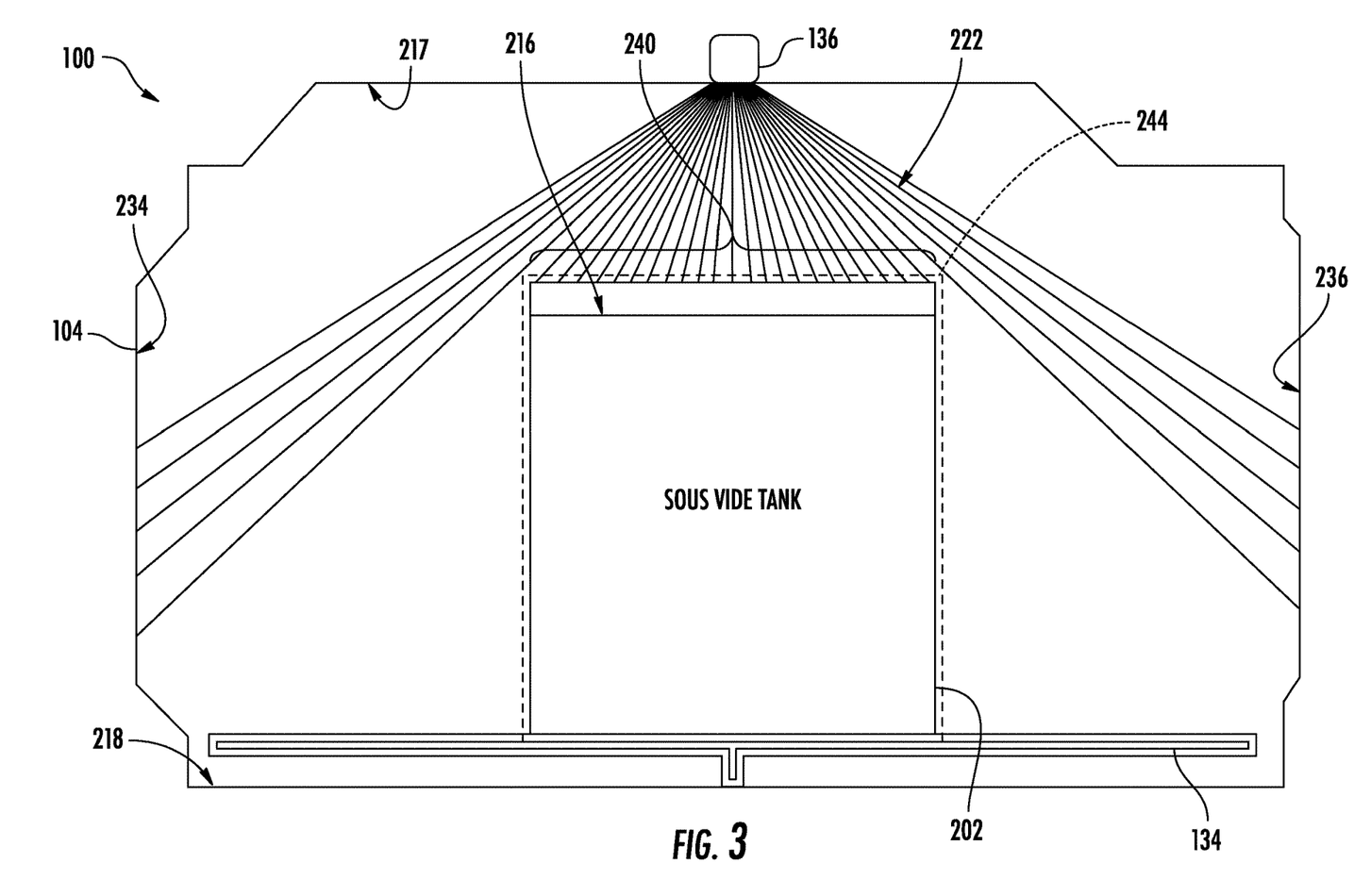
FIG. 3 provides a cross-sectional view of the exemplary microwave appliance of FIG. 1 with a temperature sensor according to exemplary embodiments of the present disclosure.

Referring now specifically to FIG. 2, sous vide assembly 200 will be described in detail according to an exemplary embodiment of the present subject matter. Sous vide assembly 200 is generally configured for receipt within cooking chamber 104 microwave appliance 100 to facilitate a sous vide cooking process. As shown in FIGS. 2 and 3, sous vide assembly 200 may be located centrally in lateral direction L and transverse direction T on bottom 218 of cooking chamber 104. However, it should be appreciated that the present subject matter is not limited to a specific construction of sous vide assembly 200 or to the particular application described, e.g., use within microwave appliance 100. Further, it should be appreciated that the present subject matter may include other cooking processes or apparatuses associated with a microwave appliance 100.

Sous vide assembly 200 generally includes an outer tank 202 and an inner tank 204 positioned inside outer tank 202 such that a heating gap 206 is defined between inner tank 204 and outer tank 202. In general, outer tank 202 may be a watertight, open-top container having a bottom wall and a plurality of sidewalls that are joined and configured for containing a volume of liquid (e.g., illustrated herein as a water 208). As will be explained in more detail below, microwave heating assembly 130 is generally configured for heating water 208 to facilitate a sous vide cooking process and cook a food item positioned within inner tank 204.

Inner tank 204 may fit inside outer tank 202 in such a way as to allow fluid flow between inner tank 204 and outer tank 202. For example, inner tank 204 may not be watertight or inner tank 204 may be below a water level 214, allowing water 208 to circulate in and out of the inner tank 204.

In some embodiments, inner tank 204 may house at least one food divider 212. As shown, food divider 212 is located within inner tank 204. Food divider 212 may be designed to separate articles into individual compartments within food divider 212 in some examples. Advantageously, food divider 212 may space items for cooking apart in inner tank 204 so proper circulation of fluids may occur in sous vide assembly 200. In some embodiments, food divider 212 may be aligned to separate articles in the sous vide assembly 200. In some embodiments, food divider 212 may also allow for better temperature readings within sous vide assembly 200 by a temperature sensor 136. Temperature readings will be described in more detail below.

As shown in FIGS. 1 through 4, temperature sensor 136 may be located within cabinet 102. Temperature sensor 136 is directed at cooking chamber 104. In some embodiments, temperature sensor 136 is located above sous vide assembly 200. Temperature sensor 136 may be directed to obtain temperature readings to a top surface 216 of water 208 or other internal portion or surface inside the cooking chamber 104. Temperature sensor 136 may be directed toward cooking chamber 104. For example, temperature sensor 136 may be located at a top portion 106 of cabinet 102 and directed downward, in vertical direction V, toward bottom surface 218 of cooking chamber 104.

According to an example embodiment, temperature sensor 136 may be an infrared sensor. Temperature sensor 136 may be an infrared camera in some embodiments. In some embodiments, temperature sensor 136 may be an infrared temperature sensing array. As shown in FIG. 4, temperature sensor 136 is an infrared sensing array and may have a wide scan area 222. In some examples, scan area 222 may be larger than the bottom surface 218 the cooking chamber 104. For example, temperature sensor 136 may sense a scan area about 75 degrees in the transverse direction T and 110 degrees in the lateral direction L. The scan area 222 may be more or less in degrees or may be orientated in a different direction (wider in lateral direction L than in transverse direction T), depending on the particular application.

Temperature sensor 136 may be capable of taking multiple temperature readings at multiple locations within cooking chamber 104. For example, for each temperature reading (e.g., each thermal image taken by an infrared camera), temperature sensor 136 may obtain a plurality of temperature values, each temperature value corresponding to a specific location within cooking chamber 104.

FIG. 3 depicts a cross-sectional view of cooking chamber 104 and temperature sensor 136. FIG. 4 depicts an example temperature map 230 that may be a depiction of temperature values and locations received from temperature sensor 136. As shown by FIGS. 3 and 4, temperature sensor 136 may report temperature readings viewing from top 217 of cooking chamber 104 directed at bottom 218 of cooking chamber 104 as a flat plane. In this manner, temperature readings may include temperature data from walls 234, 236, and bottom 218 of cooking chamber 104 due to wide-angle capabilities of temperature sensor 136. Temperature readings may also include data from the top of articles placed in cooking chamber 104, such as top water surface temperature data from sous vide assembly 200.

Controller 150 may be in operative communication with temperature sensor 136. Controller 150 may receive temperature data from temperature sensor 136. In some examples, controller 150 may be configured to create temperature map 230 from multiple temperatures received in each temperature reading from temperature sensor 136.

As shown in FIG. 4, controller 150 may generate temperature map 230 from temperature data, including temperature values, received from temperature sensor 136. As shown in FIG. 4, temperature sensor 136 may be able to supply data to generate temperature map 230 in the form of a rectangular grid. In some embodiments, temperature map 230 may depict temperature readings in the form of a rectangular grid depicting uncalibrated temperatures located along bottom surface 218 of cooking chamber 104. Further, temperature map 230 may depict temperature readings depicting uncalibrated or raw temperatures for a top surface of an article placed on the floor or turntable (e.g., turntable 134) of the cooking chamber 104 (e.g., top surface 216 of water 208 within sous vide assembly 200 as shown in FIG. 3).

In some embodiments, temperature sensor 136 may determine over 100 temperatures, each at a unique location within cooking chamber 104, with each temperature reading. In some embodiments, temperature sensor 136 may determine over 200 temperatures with each temperature reading. In some embodiments, temperature sensor 136 may determine over 500 temperatures with each temperature reading. In some embodiments, temperature sensor 136 may determine over 700 temperatures with each temperature reading. In some embodiments, temperature sensor 136 may determine over 750 temperatures for over 750 locations within cooking chamber 104 with each temperature reading.

In some embodiments, temperature sensor 136 may be configured to take a temperature reading of cooking chamber 104 or of articles within cooking chamber 104 (e.g., sous vide assembly 200) repeatedly. In some examples, temperature sensor 136 may be configured to take a temperature reading at least every second during the desired operation of temperature sensor 136. In some examples, temperature sensor 136 may be configured to take a temperature reading about every 250 milliseconds during the desired operation of temperature sensor 136. In some examples, temperature readings may be more often or less often, depending on the needs of the embodiment.

In some embodiments, a subset of the temperatures in a temperature reading is used in the methods described herein. For example, some temperature readings may be more inaccurate or based on walls 234, 236 of cooking chamber 104. Temperature data used may be data representative of an article, such as sous vide assembly 200, in cooking chamber 104.

Temperature map 230 may include a plurality of temperature data points, such as sample temperature data point 238. Each temperature data point (e.g., sample temperature data point 238) in temperature map 230 may represent a raw temperature at a location within cooking chamber 104 obtained by temperature sensor 136 during a temperature reading. The plurality of temperature data points generally represents a plurality of temperature readings taken by temperature sensor 136. According to example embodiments, controller 150 may identify one or more regions of interest and may identify temperature data points 238 corresponding to or associated with those regions of interest. For example, temperature data inside a central box 232 may represent temperature data within sous vide assembly 200, as shown by area 240 in FIG. 3.

Though temperature map 230 is shown in FIG. 4, controller 150 may interpret temperature data from temperature sensor 136 without generating a temperature map 230. For example, controller 150 may interpret data to determine which temperature values are the temperature values that would correspond to the temperature data points within central box 232 or the temperature values that correspond to the temperatures of area 240 of sous vide assembly 200.

In some embodiments, controller 150 may be configured to perform calculations based on temperature readings for a portion of the temperature data received from temperature sensor 136. For example, controller 150 may be configured to use temperature data inside central box 232 of temperature map 230 when determining calibrated temperatures from raw temperatures. The temperature data inside central box 232 of temperature map 230 may be used by controller 150 to generate an average raw temperature, as will be discussed in more detail below. In this manner, some data from each temperature reading received may be omitted from calculations, such as average temperature calculations or calibrated temperature determinations.

Cooking chamber 104 may define a heating zone 244. As shown in FIG. 3, heating zone 244 may include sous vide assembly 200. In some embodiments, heating zone 244 may be the portion of sous vide assembly 200 that temperature sensor 136 is configured to measure (e.g., top surface 216 of water within sous vide assembly 200). In such examples, raw heating zone 244 temperatures are the raw temperature values such as those shown in central box 232 in FIG. 4.

Additionally or alternatively, heating zone 244 may be the area surrounding an article in cooking chamber 104 to be heated in microwave appliance 100. In this regard, temperatures of heating zone 244 may be temperatures measured representing a portion of the article in cooking chamber 104.

Further, controller 150 may be in operative communication with microwave heating assembly 130 or magnetron. Magnetron may be turned on or operated by controller 150 to heat cooking chamber 104. In embodiments with an inverter assembly 132, controller 150 may further be in operative communication with inverter assembly 132 to set a power level of the magnetron. In some examples, controller 150 is configured to control inverter assembly 132 to set a magnetron to at least a low, medium, and high power level. In some examples, controller 150 is configured to control inverter assembly 132 to set a magnetron to at least ten power levels, with 1 being the lowest, and 10 being the highest power level.

Figure 5:
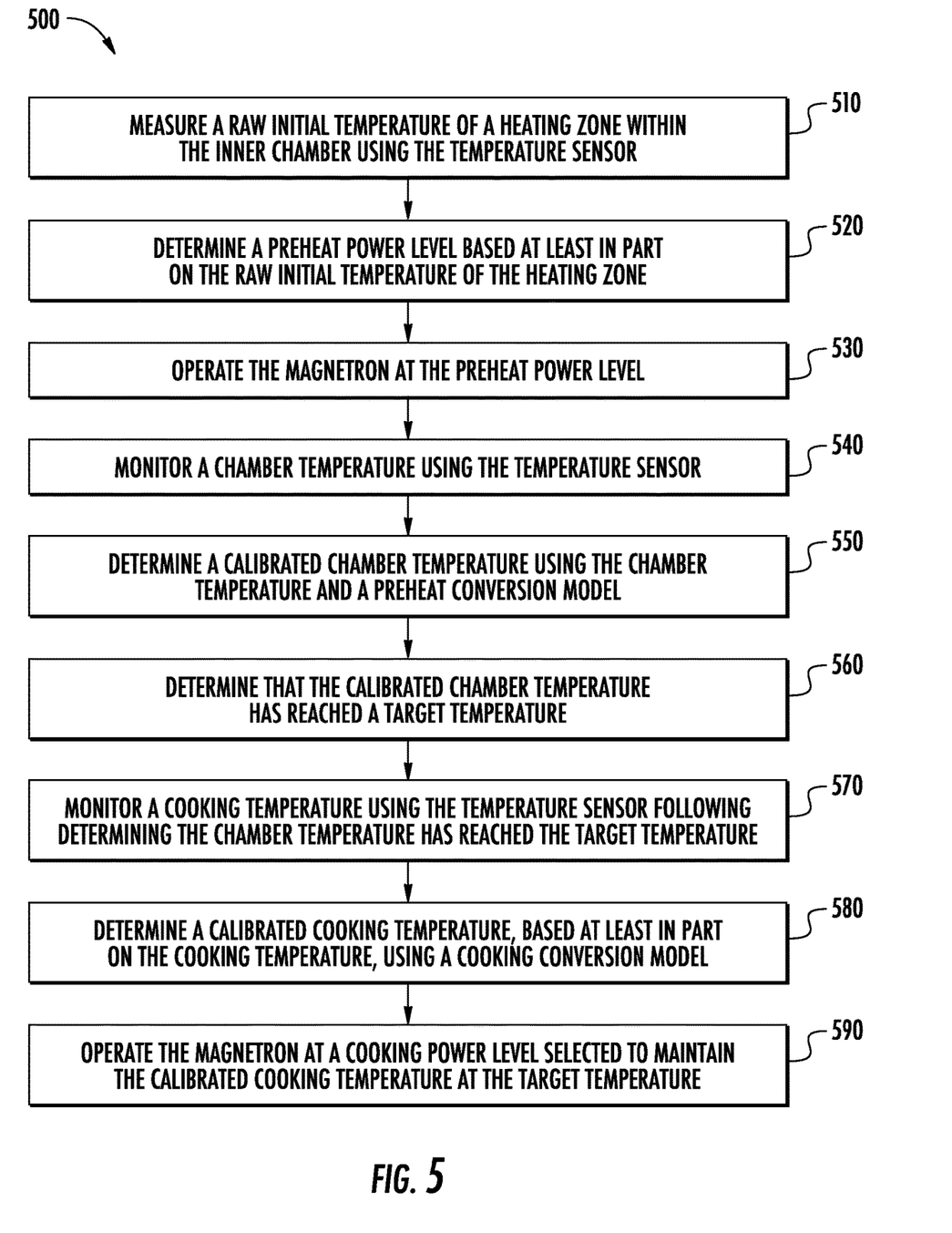
FIG. 5 provides a flow chart illustrating a temperature calibration method within the microwave according to exemplary embodiments of the present disclosure.
Figure 6:
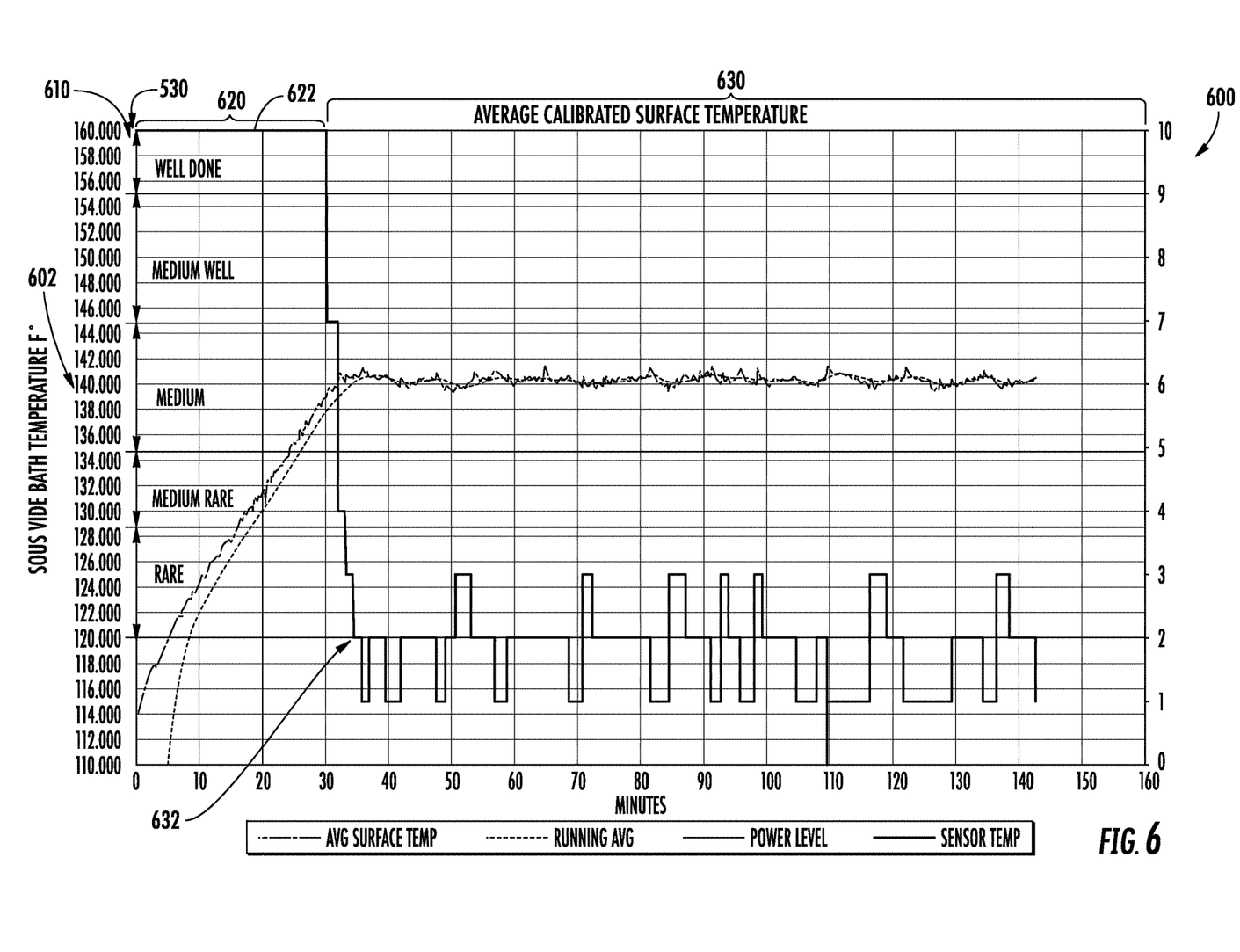
FIG. 6 provides an example graph of calibrated temperatures and power levels within a heating zone of an example microwave during an example operation according to exemplary embodiments of the present disclosure.

Turning generally to FIGS. 5 and 6, various methods (e.g., method 500) may be provided for use with microwave appliance 100 in accordance with the present disclosure. To aid in the discussion of the methods, FIG. 6 shows a temperature and power level graph 600 during various periods of method 500. In some embodiments, all, or some of the various steps of the method(s) may be performed by a suitable controller (e.g., controller 150). Thus, controller 150 may be configured to direct such a method. During such methods, controller 150 may receive inputs and transmit outputs from various other portions of the microwave appliance 100, including temperature sensor 136 or inverter assembly 132.

The present methods may advantageously perform calibration of temperatures received from temperature sensor 136 to control temperatures in cooking chamber 104 with greater accuracy during the operation of microwave appliance 100. For instance, the disclosed methods may advantageously provide calibrated temperatures during a preheating period 620 and during a cooking period 630 of microwave operation. Such may be particularly useful during sous vide cooking, where temperature accuracy is important for correct cooking operations.

Calibration of temperatures may be useful, as microwave radiation generally bounces off surfaces within cooking chamber 104, including walls 234, 236, generating additional heat during microwave operation, which makes temperature from a temperature sensor 136 in need of calibration for accuracy. Calibration may also be beneficial to compensate for the temperature of the temperature sensor itself. Calibration may also be beneficial to compensate for water evaporation inside the microwave during cooking. In example embodiments using sous vide cooking, the water bath may gain heat or heat up during a preheat period at a different rate than it maintains heat during a cooking period.

At step 510, method 500 includes measuring a raw initial temperature of a heating zone 244 within the cooking chamber 104 using temperature sensor 136. In some embodiments, controller 150 may be configured to measure the raw initial temperature by directing temperature sensor 136 to obtain a temperature reading of heating zone 244 and by receiving temperature readings from temperature sensor 136. For example, temperature sensor 136 may be directed to obtain temperature data for an article placed in cooking chamber 104, such as sous vide assembly 200. Further, temperature sensor 136 may be directed to obtain temperature data corresponding to central box 232 of temperature map 230.

In some embodiments, measuring the raw initial temperature of heating zone 244 within cooking temperature includes measuring a plurality of raw initial temperatures of the heating zone 244. The plurality of raw initial temperatures may be received from the temperature sensor 136.

At step 520, method 500 includes determining a preheat power level 622 based at least in part on the raw initial temperature of the heating zone 244. Controller 150 may be configured to determine the preheat power level 622 based on the received raw initial temperature. In some embodiments, the preheat power level 622 may be determined based on a range of preselected temperatures. For example, relatively warm raw initial temperatures may result in a lower preheat power level 622 being determined, and relatively low raw initial temperatures may result in a higher preheat power level 622 for sous vide applications. In other applications, higher or lower raw initial temperature data may have a different correlation to preheat power level 622. The controller 150 may be programmed to determine the power level for the microwave operation based on the received raw initial temperature (e.g., based on a lookup table or other suitable predetermined theoretical or empirical relationship).

Additionally or alternatively, determining the preheat power level 622 may include determining a calibrated initial temperature from the raw initial temperature. The calibrated initial temperature may provide a more accurate starting temperature for the article being heated in the microwave, allowing the microwave to set a correct preheat power level based on the more accurate calibrated initial temperature. Controller 150 may be configured to determine the calibrated initial temperature. Controller 150 may further be configured to determine the preheat power level 622 based at least in part on the calibrated initial temperature.

In some embodiments, determining the calibrated initial temperature may include finding an average of initial raw temperature data received from temperature sensor 136. Further, an average of initial raw temperature data may be used as the raw initial temperature in some embodiments. Controller 150 may be configured to receive the plurality of raw initial temperatures of the heating zone 244 from the temperature sensor 136. Controller 150 may further be configured to calculate an average of the raw initial temperatures of the heating zone 244 to determine the raw initial temperature that is used to determine the preheat power level 622.

In some embodiments, the plurality of raw initial temperatures may be the temperature readings within the central box 232 as shown in FIG. 4. As shown in FIG. 5, steps 510 and 520 may happen prior to turning on the microwave heating assembly 130 (e.g., the magnetron), or at initial period 610 in FIG. 6.

Additionally or alternatively, the calibrated initial temperature may be calculated using an initial conversion model. Controller 150 may be configured to calculate the calibrated initial temperature. Determining the calibrated initial temperature may include calculating the calibrated initial temperature using the raw initial temperature (which may be a raw temperature, or an average of raw temperatures as described above), using an initial conversion model. In some examples, the initial conversion model is an equation as follows:

$$T_{initial} = a + bx + cy$$

In the above equation, $T_{initial}$ is the calibrated initial temperature, a, b, and c are each real constants, x is the raw initial temperature, and y is an infrared sensor temperature. The infrared sensor temperature may be a temperature reading of the temperature sensor 136 (e.g., as opposed to temperature readings obtained by the sensor). In some embodiments, when temperature sensor 136 is hotter, hotter raw initial temperature readings may result, so including the temperature of the sensor itself may aid in increasing the accuracy of the calibration model. Including the infrared sensor temperature as a factor may increase accuracy and account for such situations. It is noted that though the term "infrared sensor temperature" is used herein, the infrared sensor temperature may be based on the temperature of the temperature sensor, whether it is an infrared sensor or a different type of temperature sensor.

For all calibration methods described herein, example equations are shown, but other suitable regression equations, mathematical models, or other predetermined relationships may also be used, as would be understood, depending on the needs of the embodiment. For example, the initial conversion model may be a linear regression model.

In some embodiments, once the calibrated initial temperature is calculated, controller 150 may determine the preheat power level 622 based on the calibrated initial temperature. For example, if the calibrated initial temperature is a relatively low temperature as compared to a target temperature 602, the preheat power level 622 may be set to a maximum or level 10. If the calibrated initial temperature is relatively close to target temperature 602, the preheat power level 622 may be set to a lower level, such as a level 7 out of 10 power levels. In general, this preheat power level 622 may be selected to prevent or decrease temperature overshoot during the preheating period. Other preheat power level 622 and calibrated initial temperature relationships may be used by the controller 150 depending on the needs of the embodiment.

At step 530, method 500 includes operating the magnetron at a preheat power level 622. Controller 150 may operate the magnetron at the preheat power level 622. Controller 150 may also operate inverter assembly 132 to assist in operating the magnetron at the preheat power level 622. As shown in FIG. 6, this begins the preheating period 620, shown by the beginning of graph 600 of FIG. 6.

At step 540, method 500 includes monitoring a chamber temperature using the temperature center. Controller 150 may monitor the chamber temperature by directing temperature sensor 136 to perform at least one temperature reading.

Monitoring the chamber temperature may include taking a temperature reading having a plurality of chamber temperature values. Controller 150 may turn these into a chamber temperature map, similar to temperature map 230 shown in FIG. 4. In some embodiments, only a portion of the chamber temperature values are used to monitor the chamber temperature. For example, the chamber temperature may be monitored by using the temperatures corresponding to central box 232 of temperature map 230 for each temperature reading.

At step 550, method 500 includes determining a calibrated chamber temperature using the chamber temperature and a preheat conversion model. Controller 150 may be configured to determine the calibrated chamber temperature. In some examples, the chamber temperature is an average of chamber temperature values received from the temperature sensor 136 during a temperature reading during the preheating period 620. In such examples, the chamber temperature is an average value of a plurality of temperatures of the heating zone 244 received from the temperature sensor 136. In some embodiments, a chamber standard deviation is also calculated from the plurality of chamber temperature values averaged to form the chamber temperature.

Additionally or alternatively, the calibrated chamber temperature may be calculated using a chamber conversion model. Controller 150 may be configured to calculate the calibrated chamber temperature. Determining the calibrated chamber temperature may include calculating the calibrated chamber temperature using the chamber temperature (which may be a raw temperature, or an average of chamber temperature values as described above), using the chamber conversion model. In some examples, the chamber conversion model is an equation as follows:

$$T_{chamber} = d + gz$$

In the equation above, $T_{chamber}$ is the calibrated chamber temperature, d and g are each real constants, and z is the chamber temperature monitored using the temperature sensor 136.

In some embodiments, a chamber standard deviation is also calculated from the plurality of temperatures averaged to form the chamber temperature. The preheat conversion model may use the chamber temperature (e.g., formed from an average of received chamber temperature values) and the chamber temperature standard deviation to determine the calibrated chamber temperature. In some examples, the chamber conversion model is an equation as follows:

$$T_{chamber} = d + gz + sp$$

In the equation above, $T_{chamber}$ is the calibrated chamber temperature, d, g, and s are each real constants, z is the chamber temperature formed from an average of the received chamber temperature values, and p is the chamber standard deviation of the received chamber temperature values.

The calibrated chamber temperature may be compared to a target temperature 602. In some embodiments, target temperature 602 may be predetermined or received from a user. In some examples, controller 150 receives target temperature 602 from a user prior to operating the magnetron at the preheat power level 622. Controller 150 may receive target temperature 602 from the user using the user input device 142. As shown in FIG. 6, target temperature 602 may be a desired sous vide temperature, such as a desired maximum cooking temperature.

At step 560, method 500 includes determining the calibrated chamber temperature has reached target temperature 602. Controller 150 may compare the calibrated chamber temperature to target temperature 602 and determine if the calibrated chamber temperature is at or nearly at target temperature 602. Controller 150 may determine the calibrated temperature has reached target temperature 602 by determining the calibrated chamber temperature is within a range of degrees of target temperature 602. The range of degrees acceptable to consider the calibrated chamber temperature as having reached target temperature 602 may vary depending on the needs of the embodiment.

In some embodiments, the calibrated chamber temperature is determined as reaching target temperature 602 when the calibrated chamber temperature is within about 5 degrees Fahrenheit of target temperature 602. In some embodiments, the calibrated chamber temperature is determined as reaching target temperature 602 when the calibrated chamber temperature is within about 3 degrees Fahrenheit of target temperature 602. In some embodiments, the calibrated chamber temperature is determined as reaching target temperature 602 when the calibrated chamber temperature is within about 2 degrees Fahrenheit of target temperature 602. In some embodiments, the calibrated chamber temperature is determined as reaching target temperature 602 when the calibrated chamber temperature is within about 1 degree Fahrenheit of target temperature 602. In some embodiments, the calibrated chamber temperature is determined as reaching target temperature 602 when the calibrated chamber temperature is within less than one degree Fahrenheit of target temperature 602.

Determining the calibrated chamber temperature has reached target temperature 602, but not exceeded it, is beneficial, as overshooting target temperature 602 may decrease satisfaction with the cooking process. Sous vide cooking, for example, is based on a maximum temperature, and exceeding that target maximum temperature can generate a poorer or less quality or less desirable end product. Moving to a cooking process at a lower heat level prior to exceeding the target temperature may therefore be desirable.

In some embodiments, a cooking period 630 may be started following determining the calibrated chamber temperature has reached target temperature 602. The cooking period 630 may include steps 570 through 590, as described below. As shown in FIG. 6, cooking period 630 may be a period where the temperature within heating zone 244 is maintained around target temperature 602.

At step 570, method 500 includes monitoring a cooking temperature using the temperature sensor 136 following determining the chamber temperature has reached target temperature 602. For example, controller 150 may monitor the cooking temperature using the temperature sensor 136. In some embodiments, a cooking period 630 may be started following determining the calibrated chamber temperature has reached target temperature 602.

In some examples, monitoring the cooking temperature includes directing the temperature sensor 136 to take at least one temperature reading of the heating zone 244 during cooking period 630. In some embodiments, the cooking temperature is an average of a plurality of cooking temperature values of heating zone 244 received from the temperature sensor 136.

Monitoring the cooking temperature may include taking a temperature reading having a plurality of cooking temperature values. Controller 150 may turn these into a cooking temperature map, similar to the temperature map 230 shown in FIG. 4. In some embodiments, only a portion of the cooking temperature values are used to monitor the cooking temperature. For example, the cooking temperature may be monitored by using the temperatures corresponding to the inside of central box 232 of the cooking temperature map for each cooking temperature reading.

At step 580, method 500 includes determining a calibrated cooking temperature, based at least in part on the cooking temperature, using a cooking conversion model. Controller 150 may be configured to determine the calibrated cooking temperature. In some examples, the cooking temperature is an average of cooking temperature values received from the temperature sensor 136 during the cooking temperature reading. In such examples, the cooking temperature is an average value of a plurality of cooking temperatures of the heating zone 244 received from the temperature sensor 136.

In some embodiments, determining the calibrated cooking temperature may include calculating the calibrated cooking temperature using the cooking temperature (which may be a raw temperature, or an average of temperatures as described above) and using the cooking conversion model. The cooking conversion model may be formed using any regression model, including linear regression models. In some examples, the cooking conversion model is an equation as follows:

$$T_{cooking} = h + jv$$

In the equation above, $T_{cooking}$ is the calibrated cooking temperature, h and j are each real constants, and v is the cooking temperature monitored using the temperature sensor 136. The constants h and j may be different values from the constants d and g used to determine $T_{chamber}$.

In some embodiments, the cooking conversion model is an equation as follows:

$$T_{cooking} = h + jv + k$$

In the equation above, $T_{cooking}$ is the calibrated cooking temperature, h and j are each real constants, v is the cooking temperature monitored using the temperature sensor 136, and k is an offset factor. The offset factor may be a real constant. For example, the offset factor may be a variation to adjust the calibrated cooking temperature. Other ranges for the offset factor may also be used, depending on the needs of the embodiments. Advantageously, in some examples, during the cooking period 630, calibration of the cooking temperature received from the temperature sensor 136 may consistently be off by an offset factor and adding an offset factor to the cooking conversion model may bring the resultant calibrated cooking temperature closer to the actual temperature in the heating zone 244. In some embodiments, temperatures during the cooking period may be consistently off by a factor of a few degrees Fahrenheit, which may be due to a gradual increase in heat generated by microwave radiation bouncing off the walls (e.g., wall 234, wall 236, top 217 of cooking chamber 104, or bottom surface 218 of cooking chamber 104) during the time the microwave is on. After the preheat period, there may be more microwave radiation present and bouncing off the microwave walls than during the preheat period due to the passage of time that the microwave oven has been powered on.

In some embodiments, the offset factor is less than or equal to about 5 degrees Fahrenheit. In some embodiments, the offset factor is less than or equal to about 3 degrees Fahrenheit. In some embodiments, the offset factor is less than or equal to about 2 degrees Fahrenheit. In some embodiments, the offset factor is less than or equal to about 1 degree Fahrenheit.

In some embodiments, a cooking temperature standard deviation is also calculated from the plurality of cooking temperature values averaged to form the cooking temperature. In some embodiments, the cooking conversion model may use the cooking temperature and the cooking temperature standard deviation to determine the calibrated cooking temperature.

At step 590, method 500 includes operating the magnetron at a cooking power level 632 selected to maintain the calibrated cooking temperature at target temperature 602. Controller 150 may direct the magnetron to operate at the cooking power level 632. In some embodiments, the inverter assembly 132 may also be directed by the controller 150 to aid in controlling the cooking power level 632.

Additionally or alternatively, the cooking power level 632 may be a power level much lower than the power level during the preheat period. As shown in FIG. 5, the power levels of the microwave appliance 100 may be split into 10 levels, and levels 1 through 3 may be primarily used during the cooking period 630. In embodiments where the heating zone 244 includes the sous vide assembly 200, the cooking period 630 may be used to maintain a water bath temperature in the sous vide assembly 200. In some embodiments, more levels, or a larger range of power levels may be used during the bulk of the cooking period 630, depending on the needs of the embodiment. In some embodiments, the range of power levels used in the cooking period may be based on the difference between the calibrated cooking temperature and target temperature 602.

Generally, controller 150 may compare the calibrated cooking temperature to target temperature 602. Further, controller 150 may be configured to adjust the cooking power level 632 of the microwave appliance 100 during the cooking period 630 to maintain the cooking temperature to target temperature 602 during the cooking period 630. In some embodiments, the controller 150 may direct the temperature sensor 136 to perform multiple cooking temperature readings of the heating zone 244 during the cooking period 630, may calculate a calibrated cooking temperature from each set of cooking temperature readings, may compare each calibrated cooking temperature with target temperature 602, and may adjust the cooking power level 632 as needed following each comparison of the calibrated cooking temperature with target temperature 602.

The cooking power level 632 may be adjusted to a higher or lower power level as a result of comparing the calibrated cooking temperature to target temperature 602. For example, the cooking power level 632 may be lowered if the calibrated cooking temperature is above target temperature 602. For example, the cooking power level 632 may be raised if the calibrated cooking temperature is lower than target temperature 602. In some embodiments, the controller 150 may further be configured to maintain a current cooking power level 632 when the calibrated cooking temperature is approximately equal to target temperature 602.

Ranges of acceptability to determine how the calibrated cooking temperature compares to target temperature 602 may vary based on the needs of the embodiments. In some embodiments, the calibrated cooking temperature may be considered approximately equal to target temperature 602 if the comparison is off by 2 or fewer degrees Fahrenheit. In some embodiments, the calibrated cooking temperature may be considered approximately equal to target temperature 602 if the comparison is off by 1 or fewer degrees Fahrenheit. In some embodiments, the calibrated cooking temperature may be considered approximately equal to target temperature 602 if the comparison is off by 0.5 or fewer degrees Fahrenheit.

In some embodiments, the cooking period 630 may be maintained for a predetermined cooking time length. In some embodiments, controller 150 may receive the predetermined cooking time length from the user via the input panel. In some examples, a user may select from a variety of cooking settings with set target temperatures 602 or cooking time lengths.

Embodiments described herein may include a calibration method for an infrared (herein also referred to as "IR") sensor to accurately measure sous vide bath temperatures in a microwave appliance sous vide system. Some embodiments may use an inverter assembly. In general, microwave appliance cavities may have metal walls that act as IR heat reflectors or IR emitters. When a sous vide cooking session is requested or begun during an initial period, the temperatures of sous vide water in the sous vide bath or cavity walls may be measured for calculating pre-heating time and cooking time. The sous vide water may then be heated up to a preselected sous vide temperature or target temperature during a pre-heat period.

During the pre-heat period, the microwave appliance cavity walls may be heated by absorbing microwave energy and IR radiation from the sous vide water. Generally, due to the cavity walls emitting and reflecting additional IR radiation, the IR temperature sensor may not measure with enough accuracy during the pre-heat period. Calibration, such as a preheat calibration model, may be used to determine an accurate temperature from temperature readings from the IR sensor. When the sous vide water has reached the sous vide temperature, the system may enter a steady-state or cooking period. The cooking period may require another level of calibration to maintain high measurement accuracy for food doneness.

In some embodiments, the infrared sensor may be calibrated in three separate phases or periods of the sous vide cooking session by measuring water in the sous vide bath or temperatures of items being cooked in the sous vide system. In the first phase or initial period, the method may include measuring the initial bath temperature to estimate time to preheat the sous vide system. During the initial system, the power level may be at zero (i.e., the microwave heating assembly, including the magnetron, may be off). During the second phase or preheat period, the method may include measuring the surface temperature during the preheat period to avoid overshooting the target temperature or setpoint. During the third phase or cooking period, the method may include measuring the surface temperature once the target temperature or setpoint has been reached to control the inverter. The preheat period may use a high-power level for fast preheating. The preheat period power level may not be high enough to penetrate food. Each of the three phases may use a different regression model. In some examples, each regression model may be an equation. In certain embodiments, each regression equation may be coded into a programming language such as visual basic for the monitoring software.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A microwave appliance having a vertical, a transverse, and a lateral direction, the microwave appliance comprising:
   a cabinet defining a cooking chamber;
   a door configured to allow selective entry to the cooking chamber;
   a magnetron operable to generate microwave radiation to provide heat to the cooking chamber;
   a temperature sensor directed toward the cooking chamber; and
   a controller in operative communication with the magnetron and the temperature sensor, the controller being configured to:
     measure a raw initial temperature of a heating zone within the cooking chamber using the temperature sensor;
     determine a preheat power level based at least in part on the raw initial temperature of the heating zone;
     operate the magnetron at the preheat power level;
     monitor a chamber temperature using the temperature sensor;
     determine a calibrated chamber temperature using the chamber temperature and a preheat conversion model;
     determine that the calibrated chamber temperature has reached a target temperature;
     monitor a cooking temperature using the temperature sensor following determining the chamber temperature has reached the target temperature;
     determine a calibrated cooking temperature, based at least in part on the cooking temperature and a cooking conversion model; and
     operate the magnetron at a cooking power level selected to maintain the calibrated cooking temperature at the target temperature.

2. The microwave appliance of claim 1, wherein the controller is further configured to determine a calibrated initial temperature from the raw initial temperature, and
   wherein the controller is further configured to determine the preheat power level based at least in part on the calibrated initial temperature.

3. The microwave appliance of claim 2, wherein the calibrated initial temperature is calculated using an initial conversion model.

4. The microwave appliance of claim 3, wherein the initial conversion model is an equation as follows:

$$T_{initial} = a + bx + cy,$$

where $T_{initial}$ is the calibrated initial temperature, a, b, and c are each real constants, x is the raw initial temperature, and y is a temperature value of the temperature sensor.

5. The microwave appliance of claim 1, wherein the preheat conversion model is an equation as follows:

$$T_{chamber} = d + gz$$

where $T_{chamber}$ is the calibrated chamber temperature, d and g are each real constants, and z is the chamber temperature monitored using the temperature sensor.

6. The microwave appliance of claim 1, wherein the cooking conversion model is an equation as follows:

$$T_{cooking} h + jv$$

where $T_{cooking}$ is the calibrated cooking temperature, h and j are each real constants, and v is the cooking temperature monitored using the temperature sensor.

7. The microwave appliance of claim 6, wherein the cooking conversion model includes an offset factor.

8. The microwave appliance of claim 1, wherein the raw initial temperature, the chamber temperature, and the cooking temperature are each an average of a plurality of temperatures of the heating zone received from the temperature sensor.

9. The microwave appliance of claim 8, wherein the controller is further configured to determine a chamber temperature standard deviation and a cooking temperature standard deviation,
   wherein the preheat conversion model uses the chamber temperature and the chamber temperature standard deviation to determine the calibrated chamber temperature, and
   wherein the cooking conversion model uses the cooking temperature and the cooking temperature standard deviation to determine the calibrated cooking temperature.

10. The microwave appliance of claim 1, wherein the controller is further configured to operate the magnetron at the cooking power level by adjusting the cooking power level of the microwave appliance during a cooking period based on the calibrated cooking temperature to maintain the cooking temperature to the target temperature during the cooking period.

11. The microwave appliance of claim 1, further comprising an inverter assembly operably coupled to the magnetron to adjust a power level of the magnetron.

12. The microwave appliance of claim 1, wherein the heating zone comprises a sous vide assembly.

13. The microwave appliance of claim 12, wherein the sous vide assembly further comprises an outer tank, an inner tank located within the outer tank, and a food divider located within the inner tank.

14. The microwave appliance of claim 1, wherein the controller receives the target temperature from a user prior to operating the magnetron at the preheat power level.

15. A method of operating a microwave appliance having a cooking chamber, a magnetron, and a temperature sensor, the method comprising the steps of:
   measuring a raw initial temperature of a heating zone within the cooking chamber using the temperature sensor;
   determining a preheat power level based at least in part on the raw initial temperature of the heating zone;
   operating the magnetron at the preheat power level;
   monitoring a chamber temperature using the temperature sensor;
   determining a calibrated chamber temperature based at least in part on the chamber temperature;
   determining that the calibrated chamber temperature has reached a target temperature;
   monitoring a cooking temperature using the temperature sensor in response to determining the chamber temperature has reached the target temperature;
   determining a calibrated cooking temperature, based at least in part on the cooking temperature and a cooking conversion model; and
   operating the magnetron at a cooking power level based selected to maintain the calibrated cooking temperature at the target temperature.

16. The method of claim 15, wherein the temperature sensor is an infrared sensor.

17. The method of claim 15 further comprising:
   determining a calibrated initial temperature from the raw initial temperature, and
   determining the preheat power level based at least in part on the calibrated initial temperature.

18. The method of claim 17, wherein the calibrated initial temperature is calculated using an initial conversion model.

19. The method of claim 16, wherein the raw initial temperature, the chamber temperature, and the cooking temperature are each an average of a plurality of temperatures of the heating zone received from the infrared sensor.

20. The method of claim 19, further comprising determining a chamber temperature standard deviation and a cooking temperature standard deviation,
   wherein determining the calibrated chamber temperature is further based at least in part on a preheat conversion model,
   wherein the preheat conversion model uses the chamber temperature and the chamber temperature standard deviation to determine the calibrated chamber temperature, and
   wherein the cooking conversion model uses the cooking temperature and the cooking temperature standard deviation to determine the calibrated cooking temperature.

* * * * *